UNITED STATES PATENT OFFICE.

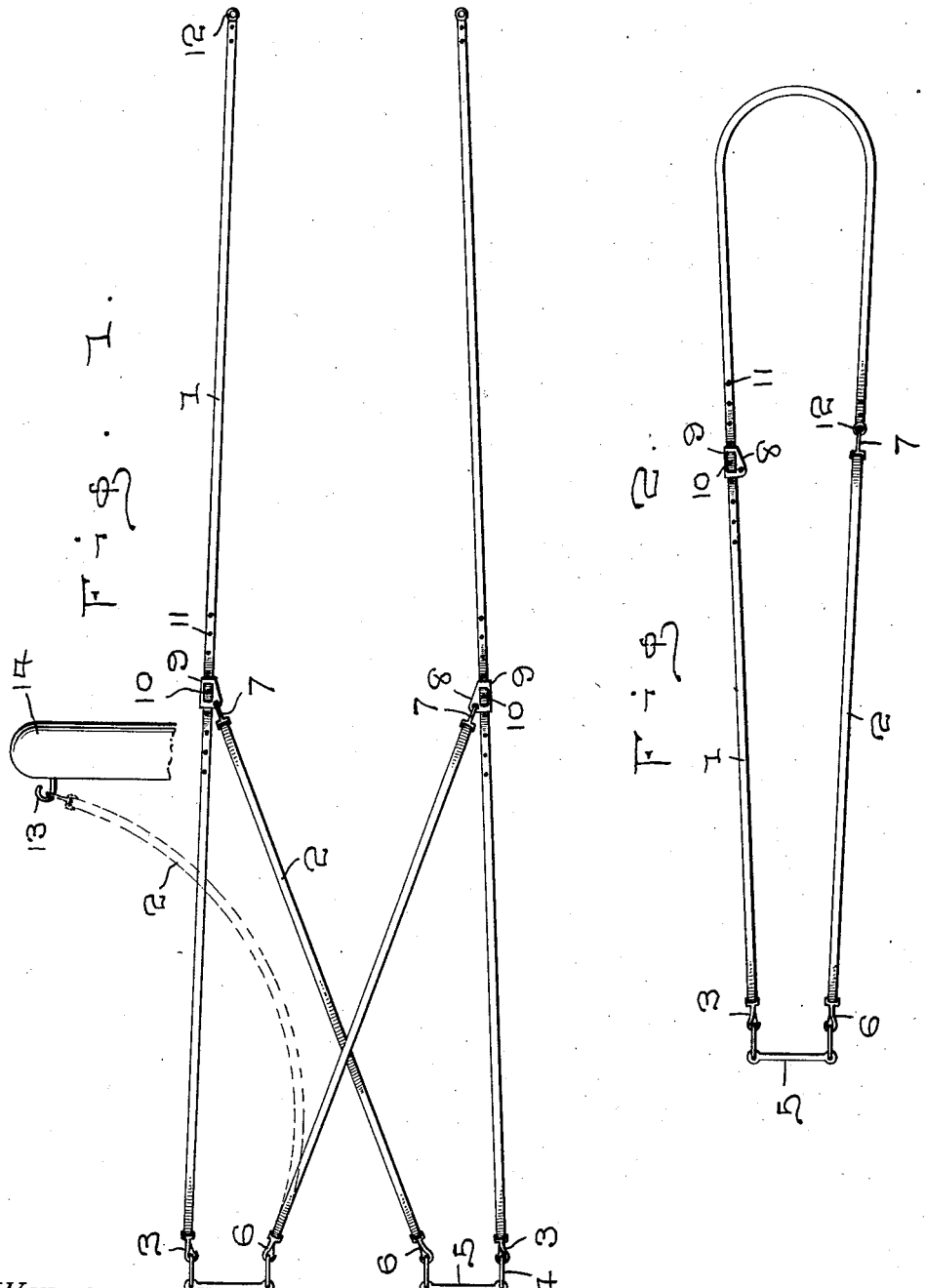

DANIEL B. POTTER, OF FREMONT, NEBRASKA.

DRIVING-REINS.

1,012,009.  Specification of Letters Patent.  Patented Dec. 19, 1911.

Application filed March 2, 1909. Serial No. 480,834.

*To all whom it may concern:*

Be it known that I, DANIEL B. POTTER, a citizen of the United States, residing at Fremont, in the county of Dodge and State of Nebraska, have invented certain new and useful Improvements in Driving-Reins; and I do hereby declare the following to be a full, clear, and exact description of the invention, such as will enable others skilled in the art to which it appertains to make and use the same.

My invention relates to new and useful improvements in harness attachments and more particularly to driving reins therefor and my object is to provide means for quickly converting the reins for driving single or double teams.

A further object is to so construct the spreader straps, that the same may be used as a hitch rein when desired and a still further object is to provide means for quickly adjusting parts of the rein.

Other objects and advantages will be hereinafter referred to and more particularly pointed out in the claim.

In the accompanying drawing forming part of this application, Figure 1 is a plan view of the reins when used for driving a double team, and, Fig. 2 is a plan view of one of the reins arranged for driving a single animal.

Referring to the drawing in which similar reference numerals designate corresponding parts throughout the several views, 1 indicates each of the reins and 2 each of the spreader straps, the forward ends of the reins 1 having snap hooks 3 attached thereto, which are adapted to engage rings 4 of the bits 5, while both ends of the spreader straps 2 are provided with snaps 6 and 7, respectively, the snaps 6 being adapted to engage the rings at the opposite ends of the bits, while the snaps 7 are adapted to engage openings in projections 8 on the adjusting buckles 9. The buckles 9 are provided with tongues 10, which are adapted to engage openings 11 in the reins 1 and by providing a plurality of the openings, the buckles may be adjusted in such manner as to cause the animals to travel closer or farther apart. The rear ends of the reins 1 are provided with loops 12, which loops may be employed when the rein is to be used for driving a single animal, the snap 7 on one of the spreaders being engaged with the loop, thereby forming a continuous rein as shown in Fig. 2. This feature of the structure is very essential, in view of the rapidity with which the reins may be converted from one form to another and if desired, the spreader straps may be used as hitch reins as shown by dotted lines in Fig. 1 and when so used, the snap 7 on one of the spreaders straps is released from its respective projection and engaged with a hook 13 on a post 14, the opposite spreader serving to hold the other animal in check.

This construction will be more fully appreciated when it is taken into consideration that in garnering hay, a team is driven into the field and one of the animals released from the vehicle and attached to a rake and when so attached, a rein may be quickly formed by securing the main rein and one of the spreaders 2 together as shown in Fig. 2 and it will likewise be seen that the parts of the rein may be as quickly readjusted to form the double reins, as shown in Fig. 1.

What I claim is:

A set of driving reins for attachment to a pair of bridle bits, comprising a pair of reins, a pair of spreader straps, a slidable loop applied to each rein having a lateral inward extension provided with an opening at its forward end, each loop having a tongue adapted to engage one of a series of openings in one of the reins, each spreader strap having at its rear end means for connecting it with the lateral extension of one of the slidable loops and at its forward end with the inner end of one of the bridle bits, and each rein having a fastening at its forward end for attachment to the outer end of one of the bridle bits and having at its rear end a fastening for connection with the fastening at the rear end on one of the spreader straps.

In testimony whereof I have signed my name to this specification in the presence of two subscribing witnesses.

DANIEL B. POTTER.

Witnesses:
 C. C. PARKER,
 HOWARD W. HANSON.